United States Patent
Miedema (10) Patent No.: US 12,231,412 B2
(45) Date of Patent: Feb. 18, 2025

(54) AUTOMATICALLY ENCRYPTING SENSITIVE DATA IN A DISTRIBUTED MICROSERVICE FRAMEWORK

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 291 days.

(21) Appl. No.: 18/092,375

(22) Filed: Jan. 2, 2023

(65) Prior Publication Data

US 2024/0223543 A1    Jul. 4, 2024

(51) Int. Cl.
*H04L 9/40*    (2022.01)
*H04L 9/06*    (2006.01)

(52) U.S. Cl.
CPC .......... *H04L 63/0457* (2013.01); *H04L 9/065* (2013.01)

(58) Field of Classification Search
CPC . H04L 63/0428; H04L 63/0457; H04L 63/10; H04L 63/18; H04L 63/20; G06F 21/10; G06F 21/106; G06F 21/12; G06F 21/125; G06F 21/14; G06F 21/6209; G06F 21/6218; G06F 21/6227
See application file for complete search history.

(56) References Cited

U.S. PATENT DOCUMENTS

| | | |
|---|---|---|
| 7,995,569 B2 | 8/2011 | Ashwood-Smith et al. |
| 8,364,036 B2 | 1/2013 | Boertjes et al. |
| 9,038,151 B1 * | 5/2015 | Chua ................ H04L 47/10 726/1 |
| 9,060,215 B2 | 6/2015 | Miedema |
| 9,252,913 B2 | 2/2016 | Al Sayeed et al. |
| 9,258,190 B2 | 2/2016 | Swinkels et al. |
| 9,438,370 B2 | 9/2016 | Swinkels et al. |
| 9,686,176 B2 | 6/2017 | Traxler et al. |
| 9,768,870 B2 | 9/2017 | Miedema et al. |

(Continued)

FOREIGN PATENT DOCUMENTS

| | | |
|---|---|---|
| WO | 2021007036 A1 | 1/2021 |
| WO | 2021030170 A1 | 2/2021 |
| WO | 2022072579 A1 | 4/2022 |

OTHER PUBLICATIONS

Yarygina et al. "Overcoming Security Challenges in Microservice Architectures" [Online], May 17, 2018 [Retrieved on: Dec. 9, 2024] , 2018 IEEE SOSE, Retrieved from: < https://ieeexplore.ieee.org/stamp/stamp.jsp?tp=&arnumber=8359144 > (Year: 2018).*

*Primary Examiner* — Eric W Shepperd
(74) *Attorney, Agent, or Firm* — Baratta Law PLLC; Lawrence A. Baratta, Jr.

(57) ABSTRACT

Systems and methods for local encryption are provided. According to one implementation, a microservice system is configured to operate according to an open standard schema and having a distributed microservice framework. The microservice system includes a processing device and a memory device, where the memory device is configured to store a computer program having instructions that, when executed, enable the processing device to perform certain steps. For example, the processing device may be configured to automatically create an encrypted version of sensitive data. Next, the processing device may be configured to incorporate the encrypted version of the sensitive data within a model associated with the microservice system.

20 Claims, 5 Drawing Sheets

(56) References Cited

U.S. PATENT DOCUMENTS

| | | |
|---|---|---|
| 9,819,565 B2 | 11/2017 | Djukic et al. |
| 10,440,128 B2 | 10/2019 | Miedema |
| 10,715,888 B2 | 7/2020 | Swinkels et al. |
| 10,797,818 B1 | 10/2020 | Croskery et al. |
| 10,891,176 B1 | 1/2021 | Miedema |
| 10,958,993 B2 | 3/2021 | Swinkels et al. |
| 10,985,838 B1 | 4/2021 | Al Sayeed et al. |
| 10,992,374 B1 | 4/2021 | Miedema et al. |
| 11,055,155 B2 | 7/2021 | Prakash et al. |
| 11,303,541 B2 | 4/2022 | Miedema |
| 11,483,369 B1 | 10/2022 | Miedema et al. |
| 2007/0206512 A1 | 9/2007 | Hinds et al. |
| 2018/0173885 A1* | 6/2018 | Ylönen ................. G06F 21/602 |
| 2019/0220289 A1* | 7/2019 | Driesen ............... G06F 9/44505 |
| 2019/0349262 A1 | 11/2019 | Miedema et al. |
| 2020/0195503 A1* | 6/2020 | Ahuja .................... H04L 63/101 |
| 2020/0344147 A1* | 10/2020 | Pianigiani ........... H04L 12/4625 |
| 2020/0358782 A1* | 11/2020 | Hager ................... G06F 21/645 |
| 2021/0042172 A1 | 2/2021 | Miedema et al. |
| 2021/0042173 A1* | 2/2021 | Prakash ................. G06F 9/546 |
| 2021/0075877 A1 | 3/2021 | Miedema et al. |
| 2022/0075674 A1 | 3/2022 | Miedema et al. |
| 2022/0158896 A1 | 5/2022 | Miedema et al. |
| 2022/0247678 A1* | 8/2022 | Atwal ................... H04L 45/645 |
| 2022/0256263 A1* | 8/2022 | Al Sayeed .......... H04J 14/0257 |
| 2022/0294692 A1 | 9/2022 | Miedema et al. |
| 2023/0115419 A1* | 4/2023 | Dey ...................... G06F 9/5044 718/104 |
| 2023/0262094 A1* | 8/2023 | Patnaikuni .............. H04L 63/20 726/1 |

\* cited by examiner

```
container test {
    leaf normal {
        type uint8;
    }
    leaf test {
        type uint32;
        encrypt:leaf "test-secret";
    }
}
```

FIG. 4A

```
container test {
    leaf normal {
        type uint8;
    }
    leaf test {
        type uint32;
        encrypt:leaf "test-secret";
    }
    leaf test-secret {
        type string;
        decrypt:leaf "test";
    }
}
```

FIG. 4B

```
container test {
    encrypt:container "test-secret";
    leaf normal {
        type uint8;
    }
    leaf test {
        type uint32;
    }
}
```

FIG. 5A

```
container test {
    encrypt:container "test-secret";
    leaf normal {
        type uint8;
    }
    leaf test {
        type uint32;
    }
}
container test-secret {
    decrypt:container "test";
    leaf normal {
        type string;
    }
    leaf test {
        type string;
    }
}
```

FIG. 5B

| Field Name | Value | Encryption Method | Encryption Version | Encrypted Value |
|---|---|---|---|---|
| abc | 123 | XOR | 1 | xor1.c91ad28cle |
| abc | 123 | XOR | 2 | xor2.5459533c5c950f44aa |
| abc | 123 | XOR | 1 | aes1.53022cf12c5959ddf3e733128930dd3d52e3ea |

FIG. 6A

| Field Name | Value | Encryption Method | Encryption Version | Encrypted Value |
|---|---|---|---|---|
| abc | 123 | XOR | 1 | {"abc":"c91ad28cle","@emeth":"xor1"} |
| abc | 123 | XOR | 2 | <abc_emeth="xor2">5459533c5c950f44aa</abc> |

AUTOMATICALLY ENCRYPTING SENSITIVE DATA IN A DISTRIBUTED MICROSERVICE FRAMEWORK

TECHNICAL FIELD

The present disclosure generally relates to networking systems and methods. More particularly, the present disclosure relates to automatically encrypting secret or sensitive data in a system having a distributed microservice framework.

BACKGROUND

Generally, configuration data is used for defining operational fields in various components of a network. During research and development, vendors may create specifically designed network equipment with configuration data that is crafted in such a way that the equipment may have certain advantages over their competitors' products. Therefore, it would behoove these vendors to keep these designs and trade secrets away from the public eye. Otherwise, if these trade secrets become public, competitors may be able to easily obtain these secrets and financially benefit from the hard work originally carried out by the vendor.

Thus, when sensitive data is present in a model, such as in the configuration data, some vendors may execute certain options, such as 1) omitting the sensitive data, 2) allowing sensitive data to be reported after encrypting the entire output, and 3) redacting the sensitive data (e.g., replacing the sensitive data with *****), etc. For example, this can be done for fields that are parsable as unrestricted strings. For elements that are not strings and elements that follow a pattern, there are limits to how a string can be redacted and still be schema compliant. In these cases, each of these options can be applied based on privilege levels as well.

Apart from the automatic handling of this data in the model, users can also hide the data, but this may not be appropriate. Alternatively, the users can redefine alternate forms of the sensitive data that are hashed or encoded such that the original fields can be recoverable. This forces the application to be able to encode/decode this data for all interfaces. However, it also means that the data is passed through the system at least once in unencrypted form and can be inspected or accidentally logged along the way.

Thus, omitting or redacting sensitive fields can remove or obfuscate the data from reporting. However, for provisioning or debugging, this means that the true value cannot be determined, even by a privileged user. Encrypting a whole file for a database can solve the database problem, but this means that the entire database must be encrypted, even if only some of the data is sensitive. This also does not solve the problem for logs or external interfaces. Hiding the data may work, but, for cases where the data needs to be present in an external interface (e.g., the data is configuration data or it needs to be exposed to privileged users), hiding is not effective.

Application level field duplication and encoding/decoding force the application to do the work of encryption. Also, these are ineffective in hiding the data when it flows through subsystems that do not understand the relationship between the encoded and decoded data. Logs and external interfaces may still report plain text secret data because there is no way for those subsystems to know if it is sensitive. Therefore, there is a need to perform encryption on a framework level without the need of application-level encryption.

BRIEF SUMMARY

The present disclosure is directed to systems and methods for automatically encrypting sensitive data, particularly in a system having a distributed microservice framework. A process, according to one implementation, may be performed by a single microservice component operating according to an open standard schema within the system having the distributed microservice framework. The process includes a step of automatically creating an encrypted version of sensitive data. Also, the process includes a step of incorporating the encrypted version of the sensitive data within a model associated with a microservice system.

According to additional embodiments, the process may include a step of communicating the encrypted version of the sensitive data downstream within the distributed microservice framework. The sensitive data, for example, may include configuration data associated with a microservice system. The process may also include a step of defining a "type" of the created encrypted version incorporated within the model as a "string."

The sensitive data, at least when it is in an unencrypted form, is configured to be compliant to the open standard schema. After incorporating the encrypted version of the sensitive data into the model, the process may further include a step of allowing a privileged user to convert between the encrypted version and the unencrypted form. The encrypted version of the sensitive data may be stored in at least one of a memory device, Random-Access Memory (RAM), a database, a log, a message field, and a syslog field within the distributed microservice framework. The distributed microservice framework may be part of a Software-Defined Network (SDN) architecture. The process may also include a step of automatically creating the encrypted version of the sensitive data in response to receiving a deserialized model.

The process may also include steps of a) receiving one or more sets of encrypted versions of sensitive data from an upstream microservice component, and b) transmitting the one or more sets of encrypted versions of sensitive data to a downstream microservice component. Alternatively, the process may include steps of a) receiving one or more sets of encrypted versions of sensitive data from an upstream microservice component, and b) decrypting the one or more sets of encrypted versions of sensitive data according to a code plug-in and without relying on a software application to handle serialization and deserialization of the sensitive data.

The step of incorporating the encrypted version of the sensitive data within the model may further include a step of enabling a privileged user to enter an extension within the model, wherein the extension includes a user command to encrypt an unencrypted version of the sensitive data and a field name to be used for identifying a field of the model to be encrypted. The field may be an entire container of the model and/or a leaf of the container. The process may also include steps of a) automatically creating the field within the model based on the user command, and b) supplying the field name to the field. Also, the process may include a step of automatically removing the unencrypted version of the sensitive data.

Before the step of automatically creating the encrypted version, the process may include steps of a) identifying one or more fields in the model that include the sensitive data, and b) tagging the one or more fields as being encryptable. The process may also include a step of allowing a privileged user to apply additional encrypting or hashing to data transmitted within the distributed microservice framework. The encrypted version of the sensitive data may be configured to hide the sensitive data from one or more non-privileged users using one or more northbound interfaces in the distributed microservice framework and reduces a potential attack space within the distributed microservice framework where the one or more non-privileged users might access the sensitive data. In some embodiments, the distributed microservice framework may include a photonic line operating according to hidden operational settings and computations related to the photonic line, wherein the sensitive data includes the trade secrets and is therefore hidden.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for performing various preprocessing techniques for encrypting secretive data within a framework of a communications network. In particular, this preprocessed encryption may be applied on top of other user-based encryption strategies. Thus, the encryption policies described in the present disclosure are configured to detect secret data as soon as reasonably possible and then apply some form of encryption to hide this secret data. Then, when the secret data is shared internally, stored in memory (e.g., in a database), or logged in some manner, this data does not allow third party users to see this sensitive data. In some cases, the secret data may be configuration data used for designing the operational parameters of network equipment.

The network equipment may be defined according to a general schema. Then, based on the schema, containers may be developed for the network equipment. The containers may include fields (or leaves) that define certain device characteristics.

Based on this type of setup, certain containers, fields, leaves, etc. having secret data (e.g., trade secrets) may be tagged in the model as encryptable (e.g., having characteristics in which the data can be encrypted). Once tagged as encryptable, the models for each Network Element (NE) can be preprocessed to hide this secret data. The preprocessing of the containers, fields, or leaves can be done to "extend" the model (e.g., similar to Yet Another Next Generation (YANG) extensions) to include encrypted versions of the container, fields, or leaf. The "type" of data may be defined such that it can hold the encoded form of the data. Also, descriptions may be modified to explain that this is encrypted data. Also, ranges and restrictions may be removed. Furthermore, metadata may also be added to describe the relationship between the plaintext and encoded versions of the field.

Data is provided to the framework (e.g., at compile time, at run time, etc.) to allow the fields to be encrypted or decrypted with an appropriate algorithm or key. Incoming data on an interface may be deserialized, but the encrypted form may be presented to the internal subsystems (e.g., microservice components). Encrypted forms of the fields may be able to flow through the subsystems or microservice components. It should be noted that, according to the embodiments described in the present disclosure, the microservices (e.g., logging, messaging, etc.) may be configured such that they only see the encrypted forms.

It should also be noted that encrypted data may arrive at a microservice component (or subsystem) that needs to process the data in its decrypted (or unencrypted) form. The framework (or pipeline) of the microservice components may be configured to allow the encrypted fields to be decrypted and then used locally. For example, the aspect of how to keep the plain representations in memory from being crackable beyond this point may be a choice of the target application. Data saved in a database can be saved and recovered in its encrypted form and then decrypted by the application as needed. The systems and methods of the present disclosure may be configured to enforce that data is not supplied in both encrypted and unencrypted formats.

Figure 1:
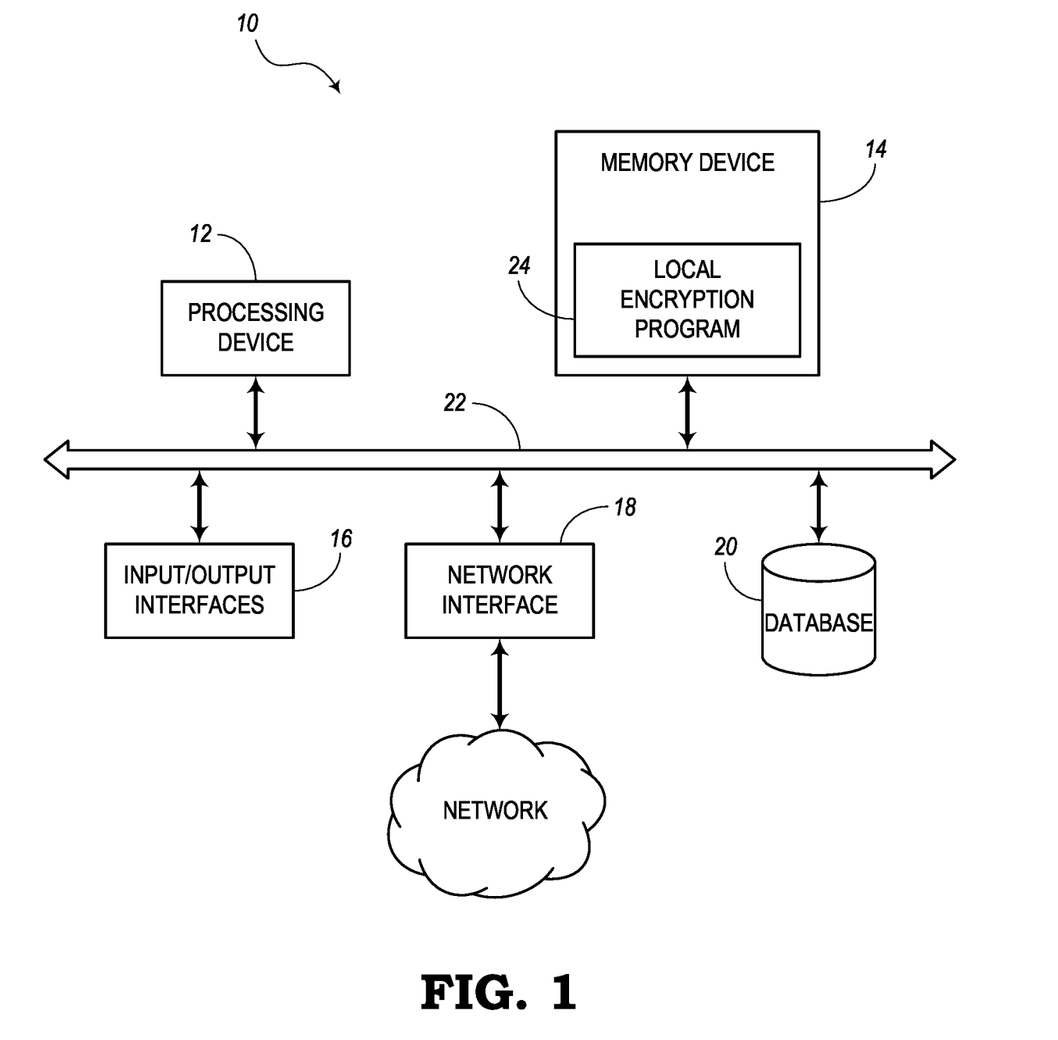
FIG. 1 is a block diagram illustrating a Network Element (NE) operating in a network, according to various embodiments.

FIG. 1 is a block diagram illustrating an embodiment of a Network Element (NE) 10 operating in a network. In the illustrated embodiment, the NE 10 may be a digital computing device that generally includes a processing device 12, a memory device 14, Input/Output (I/O) interfaces 16, a network interface 18, and a database 20. It should be appreciated that FIG. 1 depicts the NE 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Furthermore, the NE 10 may include a local encryption program 24 that may be implemented in any suitable combination of software or firmware in the memory device 14 and/or hardware in the processing device 12. Generally, the local encryption program 24 may be configured to perform various steps for encrypting secret data in a microservice component, which may be part of a system (e.g., Software-Defined Networking (SDN) system, etc.) having a plurality of microservice components within a distributed microservice framework. The local encryption program may include computer logic having instructions that enable the processing device 12 to perform encryption as described in the present disclosure. In one implementation, for example, the local encryption program 24 may be configured to enable the processing device 12 to automatically create an encrypted version of sensitive data. Then, the local encryption program 24 may be configured to enable the processing device 12 to incorporate the encrypted version of the sensitive data within a model associated with the microservice component.

The instructions of the local encryption program 24 may further enable the processing device 12 to perform the step of communicating the encrypted version of the sensitive data downstream within the distributed microservice framework. The sensitive data, for example, may include configuration data associated with the microservice component. The instructions may further enable the processing device 12 to perform the step of defining a type of the created encrypted version that is incorporated within the model as a string. The local encryption program 24 may also include many additional features as described throughout the present disclosure.

Figure 2:
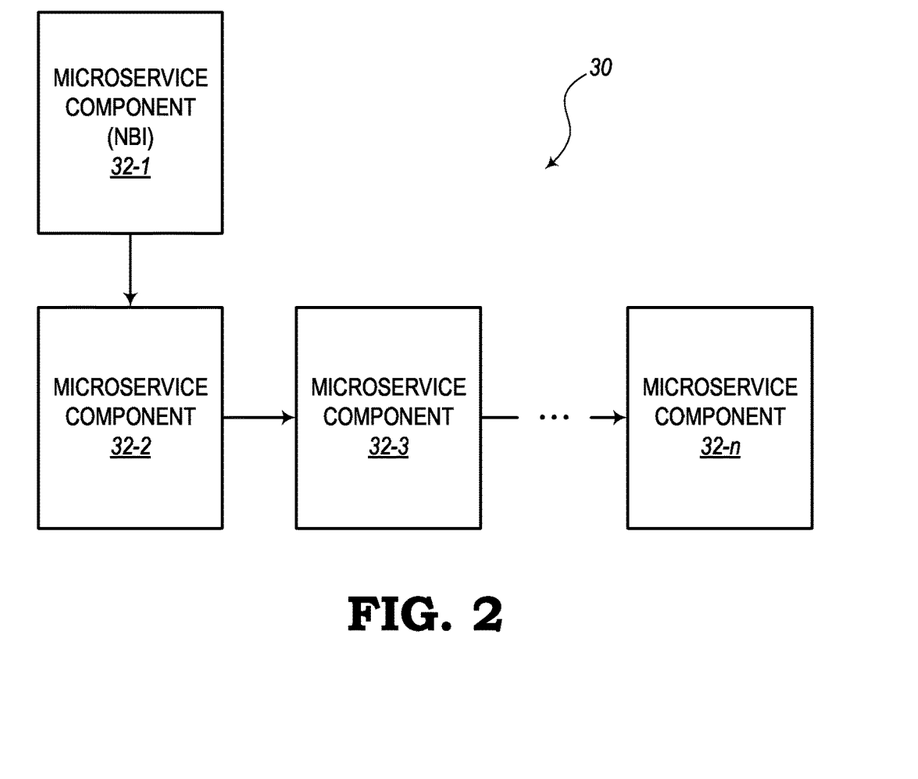
FIG. 2 is a block diagram illustrating a distributed microservice framework, according to various embodiments.

FIG. 2 is a block diagram illustrating an embodiment of a distributed microservice framework 30. The distributed microservice framework 30, as shown, includes a plurality of microservice components 32-1, 32-2, . . . , 32-n. For simplicity, the microservice components 32 in this embodiment are arranged along a single pipeline (e.g., path, route, etc.). Each microservice component 32 is configured to be modeled with a schema that defines the distributed microservice framework 30. Also, each microservice component 32 may include individual characteristics that give the component privileges with respect to other components and may allow the component to perform certain functions that may differ from the other components. For example, a first microservice component 32-1 may be configured as a northbound interface (NBI) and may include a model that defines certain fields for acting as an NBI.

The embodiments of the present disclosure are configured to provide ways to automatically generate encryptable models from existing schemas and provide methods to allow for declarative config operations to continue to be supported while hiding details of sensitive information from a non-privileged user. The embodiments are configured to design models and schemas in such a way that data, which is compliant to the model, is "open" data or unencrypted data. Fields may be defined to include certain "types" and may have restrictions and semantics imposed by the schema.

For data that may be modeled via a schema and is recognized as sensitive data (e.g., passwords, values that should be hidden from non-privileged users, etc.), it is normally difficult (or impossible) in the conventional systems to encrypt the data within a distributed microservice framework so that the data cannot be "seen" by a non-privileged user. However, according to the embodiments of the present disclosure, the present systems and methods are configured to introduce a way to make an "encryptable" version of a model, which can be used by non-privileged users on various interfaces of the distributed microservice framework 30. This alternative model of the present disclosure can be integrated into an existing tree or Application Programming Interface (API) hierarchy to exist alongside the "open" version.

This model can also be used in databases and logs which may be routinely inspected or made visible by third party applications. According to various embodiments, the data in the sensitive fields may be represented in an encrypted form that can be decrypted.

Alongside the alternative model is a method that can automatically convert between the open and encrypted forms of the model. This also allows the least possible attack space since the fields will be encrypted as soon as an open model is deserialized. Even "in-RAM" inspections will not show the open fields as they pass through microservices or infrastructure that are not associated with users having the credentials to inspect it.

The open and encrypted forms of the models can be distinguished by namespace or base name, or the open model itself can replaced externally by the encrypted form. Field names may also be encrypted or obfuscated to hide the sensitive nature of the field names themselves. According to one method, an owner of the model (e.g., a vendor that has developed the model) can explicitly provide the name of the encrypted form of the field or container. In some cases, the system can automatically generate an obfuscated name for the field to make the fields less comprehensible. Also, the schema associated with the distributed microservice framework 30 can be modified to have encrypted forms of leaves rather than whole containers.

FIGS. 3A-3D are block diagrams illustrating different microservice components 32 configured to operate in the distributed microservice framework 30. According to some embodiments, one microservice component 32a in the pipeline may be configured to receive unencrypted data "abc" at its input and provide a locally encrypted version of this data of "AF49=" at its output. A second type of microservice component 32b in the pipeline may be configured to receive the encrypted version "AF49=" at its input and pass the same version "AF49=" at its output. A third type of microservice component 32c in the pipeline may be configured to receive the encrypted version "AF49=" at its input and pass the version to the output of an adjacent component. A fourth type of microservice component 32d in the pipeline may be configured to receive the encrypted version "AF49=" at its input, use a code plug-in to decrypt the encrypted version, and then provide the decrypted version "abc" at its output.

According to the various implementations of the present disclosure, data can be applied in unencrypted form (e.g., as with microservice component 32a) and the system will automatically encrypt and hide the data. Also, the data exported from a model can be reapplied and have the same result (e.g., as with microservice component 32b). The data can also be exported from one device and applied to another device, where the result is the same unencrypted values (e.g., as with microservice component 32c). Also, a privileged user (e.g., debug user) can request the unencrypted data (e.g., as with microservice component 32d).

Therefore, according to various embodiments, a microservice component (e.g., any of the microservice components 32-1, 32-2, 32-3, . . . , 32-n, 32a, 32b, 32c, 32d, etc.) may be configured to operate according to an open standard schema within a system having a distributed microservice framework (e.g., distributed microservice framework 30). The microservice component 32 may include a processing device (e.g., processing device 12) and a memory device (e.g., memory device 14), where the memory device may be configured to store a computer program (e.g., local encryption program 24) having instructions that, when executed, enable the processing device 12 to perform the steps of 1) automatically creating an encrypted version of sensitive data and 2) incorporating the encrypted version of the sensitive data within a model associated with the microservice component 32.

Figure 3A:
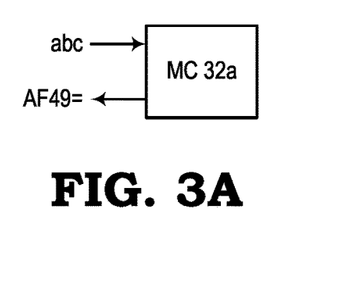
FIGS. 3A-3D are block diagrams illustrating different microservice components configured to operate in a distributed microservice framework, according to various embodiments.
Figure 3B:
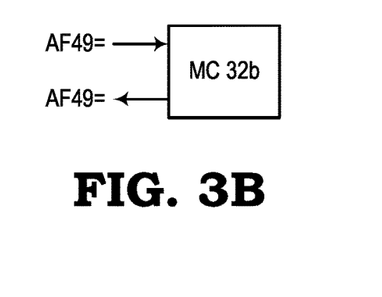
Figure 3C:
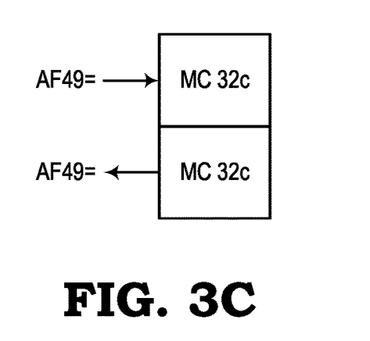
Figure 3D:
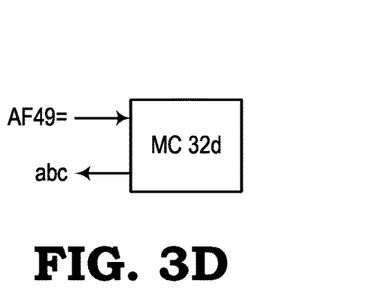

The instructions may further enable the processing device 12 to perform the step of communicating the encrypted version of the sensitive data downstream within the distributed microservice framework 30. For example, the sensitive data may include configuration data associated with the microservice component 32. The instructions may further enable the processing device 12 to perform the step of defining a "type" of the created encrypted version incorporated within the model as a "string," regardless of the original type of the sensitive data. The sensitive data, at least when it is in an unencrypted form, may be compliant to the open standard schema. After incorporating the encrypted version of the sensitive data into the model, the instructions may further enable the processing device 12 to perform the step of allowing a privileged user (e.g., user of microservice component 32d) to convert between the encrypted version and the unencrypted form.

The microservice component 32 described herein may be further defined whereby the encrypted version of the sensitive data may be stored in the memory device 14 (e.g., RAM, a log, a message field, and a syslog field, etc.) and/or in the database 20 within the distributed microservice framework 30. The distributed microservice framework 30, for example, may be part of a Software-Defined Network (SDN) architecture. The instructions may further enable the processing device 12 to perform the step of automatically creating the encrypted version of the sensitive data in response to receiving a deserialized model.

In addition, the instructions may further enable the processing device 12 to perform the steps of a) receiving one or more sets of encrypted versions of sensitive data from an upstream microservice component, and b) transmitting the one or more sets of encrypted versions of sensitive data to a downstream microservice component. Alternatively, the instructions may further enable the processing device 12 to perform the steps of a) receiving one or more sets of encrypted versions of sensitive data from an upstream microservice component, and b) decrypting the one or more sets of encrypted versions of sensitive data according to a code plug-in and without relying on a software application to handle serialization and deserialization of the sensitive data.

The step of incorporating the encrypted version of the sensitive data within the model may further include the step of enabling a privileged user to enter an extension within the model, wherein the extension may include a user command to encrypt an unencrypted version of the sensitive data and a field name to be used for identifying a field of the model to be encrypted. The field may be one of an entire container of the model and a leaf of the container. The instructions may further enable the processing device 12 to perform the steps of a) automatically creating the field within the model based on the user command, and b) supplying the field name to the field. Also, the instructions may further enable the processing device 12 to perform the step of automatically removing the unencrypted version of the sensitive data.

Before the step of automatically creating the encrypted version, the instructions may further enable the processing device 12 to perform the steps of a) identifying one or more fields in the model that include the sensitive data, and b) tagging the one or more fields as being "encryptable." The instructions may further enable the processing device 12 to perform the step of allowing a privileged user to apply additional encrypting or hashing to data transmitted within the distributed microservice framework.

Furthermore, the encrypted version of the sensitive data is configured to hide the sensitive data from one or more non-privileged users (e.g., using one or more northbound interfaces in the distributed microservice framework 30) and reduce a potential attack space within the distributed microservice framework 30 where the one or more non-privileged users might access the sensitive data. In on example, the distributed microservice framework 30 may include a photonic line operating according to trade secrets defining operational settings and computations related to the photonic line, wherein the sensitive data includes the trade secrets.

It may be noted that the encryption can optionally exclude salts or seeds, which can differ between servers using the same model. Both versions of the model can optionally be exposed to a client or user.

According to the examples described below with respect to FIGS. 4 and 5, modifications can be made to models of one or more microservice components 32 in the distributed microservice framework 30. The creation of encrypted forms of the entire containers or the leaves of the containers can be done in multiple ways. For example, the systems and methods of the present disclosure may convert the leaf to a union that contains an encrypted version. The systems and methods may add an encrypted leaf as a peer to the leaf. Also, the systems and methods may create an encrypted peer container to the nominal one that includes copies of all leaves or children that have encrypted forms.

When an encrypted version is created in pre-processing, additional metadata can be added to the generated model to indicate the target for decryption when the framework performs serialization or deserialization of the items. When data supported by this model is parsed, the data that is flagged as encrypted will be deserialized to the encrypted form, even if the data supplied is not encrypted.

Applications can optionally provide keys, salt, or complete functions to help perform the encryption/decryption functions in the framework. However, once the data is in encrypted form, it can flow through the distributed microservice framework 30 and show up in incidental services (e.g., logging services, messaging services, etc.) in protected form.

Figure 4A:
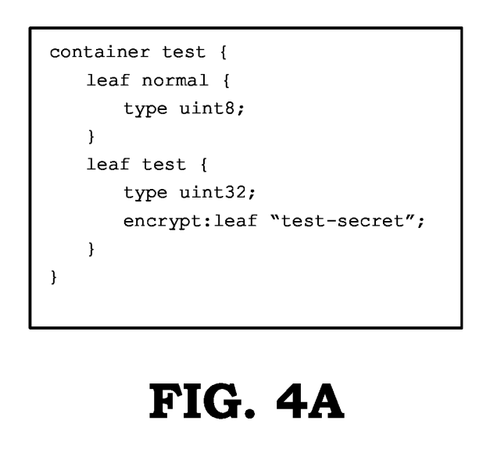
FIGS. 4A and 4B are diagrams illustrating modifications to a leaf of a model defining a schema related to operation of a microservice component, according to various embodiments.
Figure 4B:
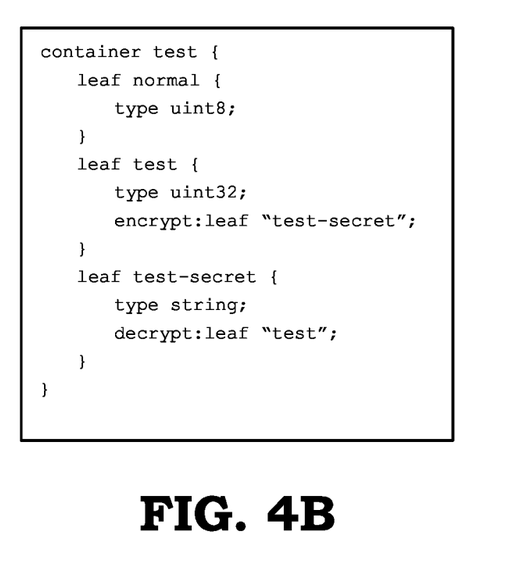

FIGS. 4A and 4B are diagrams illustrating an example in which modifications are made to a "leaf" of a model that defines a schema related to operation of a microservice component. In one embodiment, a method may be configured to use an encrypted model that would normally be provided by metadata. If the model is editable, the metadata can be added directly. If not, the metadata can be sideloaded to indicate the leaves and elements that need encrypted versions created.

In this example, a model 40 with respect to a "container test" for a microservice component 32 is shown in FIG. 4A. The container test includes a first leaf (i.e., "leaf normal") and a second leaf (i.e., "leaf test"). Leaf normal includes data having type uint8 (i.e., an unassigned integer with 8 bits). Leaf test includes data having type uint32 (i.e., an unassigned integer with 32 bits). As shown, a line of code is added to the leaf test. That is, the command "encrypt: leaf 'test-secret'" is added. This line may be added by a user or designer for customizing a client's system. Alternatively, this line may be added automatically in response to detecting secret data in the model 40. The line may be configured as metadata or an extension for a schema and may be hand-crafted by the user or designer. The added line (i.e., "encrypt:leaf 'test-secret'") is an instruction to encrypt data from the leaf into a new leaf and name this new leaf "test-secret."

In response to the added line, the local encryption program 24 and/or other systems and methods of the present disclosure are configured to create a modified model 42, as shown in FIG. 4B. The added line "encrypt: leaf 'test-secret'" may be left in the leaf test. Also, a new leaf, named "test-secret," is created automatically. The leaf test-secret converts the type of data to "string" (i.e., "type string") and an encrypted form or version of the data is formed. Also, a decrypt: leaf "test" line is added to leaf test-secret to point back to the leaf-test when the data is decrypted.

Figure 5A:
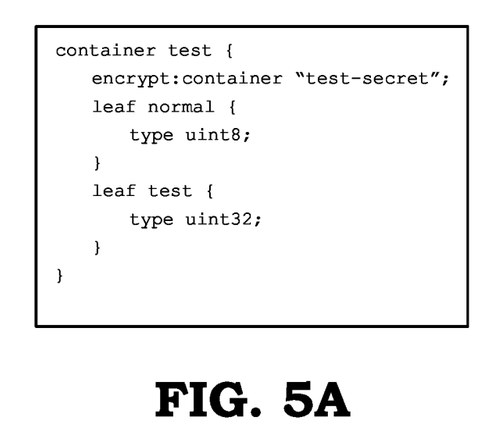
FIGS. 5A and 5B are diagrams illustrating modifications to a container of a model defining a schema related to operation of a microservice component, according to various embodiments.
Figure 5B:
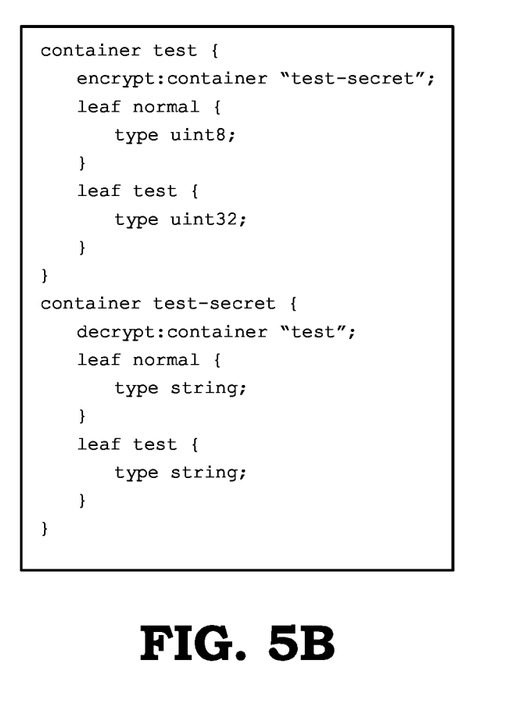

FIGS. 5A and 5B are diagrams illustrating an example in which modifications are made to a container of a model defining a schema related to operation of a microservice component. In one embodiment, a method may be configured to use an encrypted model that would normally be provided by metadata. If the model is editable, the metadata can be added directly. If not, the metadata can be sideloaded to indicate the leaves and elements that need encrypted versions created.

In this example, a model 44 with respect to a "container test" for a microservice component 32 is shown in FIG. 5A. The container test includes a first leaf (i.e., "leaf normal") and a second leaf (i.e., "leaf test"), similar to FIG. 4A. Leaf normal includes data having type uint8 (i.e., an unassigned integer with 8 bits). Leaf test includes data having type uint32 (i.e., an unassigned integer with 32 bits). As shown, a line of code is added to the entire container. That is, the command "encrypt:container 'test-secret'" is added. This line may be added by a user or designer for customizing a client's system. Alternatively, this line may be added automatically in response to detecting secret data in the model 40. The line may be configured as metadata or an extension for a schema and may be hand-crafted by the user or designer. The added line (i.e., "encrypt:container 'test-secret'") is an instruction to encrypt data from the container into a new container and name this new container "test-secret."

In response to the added line, the local encryption program 24 and/or other systems and methods of the present disclosure are configured to create a modified model 46, as shown in FIG. 5B. The added line "encrypt:container 'test-secret'" may be left in the container test. Also, a new container, named "test-secret," is created automatically. The container test-secret converts the type of data in both the leaf normal and leaf test to "string" (i.e., "type string") and an encrypted form or version of the data is formed in the new container. Also, a decrypt:container "test" line is added to container test-secret to point back to the container test when the data is decrypted.

It should be noted that any suitable type of encryption techniques or algorithms may be used for encrypting the secret data and/or for encrypting other data throughout the systems. It also should be noted that schema data usually has limited valid values that can be supported. Booleans can be true or false. A uint8 with a range of [0 . . . 10] can only have 11 values. Encrypting this data can result in forms that are not easily recoverable, but due to the limited number of possible values, the data can possibly be mined by exploring the space through some means. An additional form to help provide more entropy can involve a mechanism to provide salt or a method to internally extend the native data type to one with larger range and then add random or pseudorandom elements to the field to allow the encrypted space to have a larger size than the native data.

A simple version of this is to map all odd integers in a uint32 space to a Boolean value of "True" and all even integers in that space to "False." The addition of randomness here also implies that multiple values can be generated for the same output. The implication that a Boolean value can have the same internal value (True), but multiple value external encrypted values may weaken the encryption by providing enough data to expose or reverse engineer the encryption keys. If additional data is added, it should be related to the field name or the path so that the additional data is consistent and unchanging on a field by field basis. So, a value of "true" can take on multiple values in the encryption space but only two values for the specific field. This is non-random, model based salt that can provide additional entropy or seeds for the algorithm Another version can group low entropy fields together into chunks that are encrypted together. The disadvantage of this is that all the fields always need to be provided together. For cases where just one field has changed (in a notification) or one field is being modified (in a config operation) the values of all other fields may not be available.

Another implementation may choose to provide a field specific encryption for Boolean values so that exposure of the encryption methods through analysis on low entropy fields does not compromise the encryption for other fields.

Figure 6A:
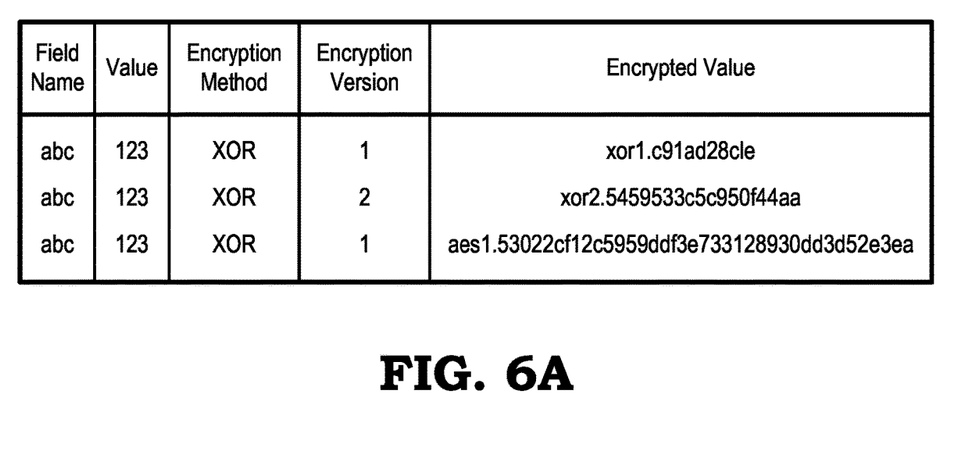
FIGS. 6A and 6B are tables illustrating encryption processes, according to various embodiments.
Figure 6B:
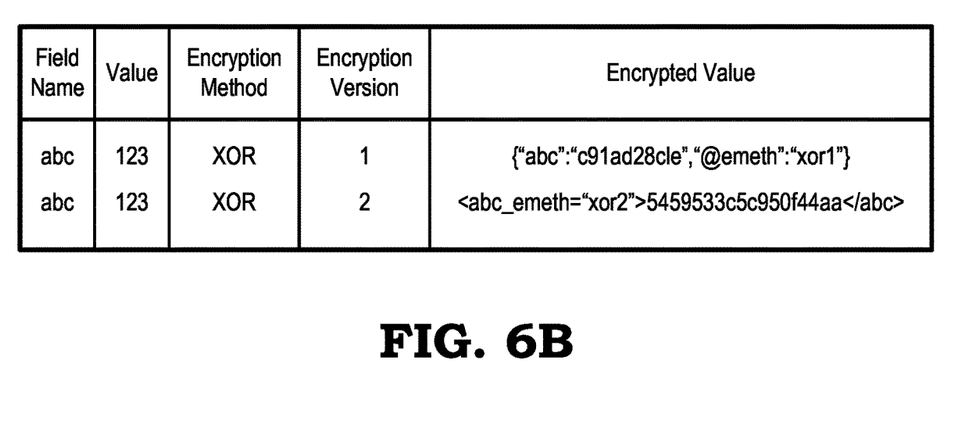

This has the complication that the client will need to understand and implement different encryption methods for each field. Another form accepts that encryption of low entropy fields does not provide enough value to perform encryption FIGS. 6A and 6B show examples of tables 50, 54, respectively. When encryption is done, in reference to table 50 of FIG. 6A, some metadata should also be added to the encrypted string to indicate the method of encryption or the version of the algorithm. This is needed so that encryption methods can be autodetected and changed in future releases if the methods improve or need to be rotated. The encrypted values may include prefixes XOR1, XOR2, AES1, etc.

The methods and versions may also be hidden in some case, but the methods of encrypting this metadata may not have a version and method that is changeable, or it may also need metadata to indicate its method. An alternative is that the metadata can be provided as an attribute in the data encoding, but not all encoding formats support metadata extensions to hold this data.

One consideration in this example is versioning. The method of encryption is identified. A prefix may be added on this and may define the method of encryption. The versions may be saved, for example, in a database. If the encryption method is changed, such as if the original method was not working or it got hacked and a user wants to make a new version, then the user can upgrade from this first version 1 of XOR to a new version 2 of XOR.

Figure 7:
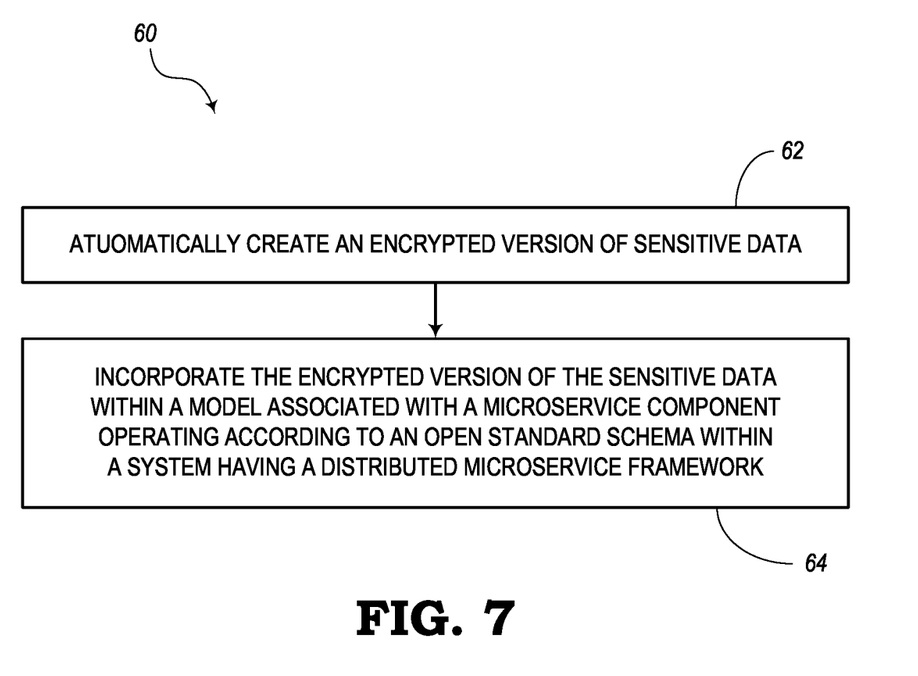
FIG. 7 is a flow diagram illustrating a process to be performed by a microservice component operating in a system having a distributed microservice framework, according to various embodiments.

FIG. 7 is a flow diagram illustrating an embodiment of a process 60 to be performed by a microservice component operating according to an open standard schema within a system having a distributed microservice framework. The process 60 includes a step of automatically creating an encrypted version of sensitive data, as indicated in block 62. Also, the process 60 includes a step of incorporating the encrypted version of the sensitive data within a model associated with the microservice component, as indicated in block 64.

According to additional embodiments, the process 60 may include a step of communicating the encrypted version of the sensitive data downstream within the distributed microservice framework. The sensitive data, for example, may include configuration data associated with the microservice component. The process 60 may also include a step of defining a "type" of the created encrypted version incorporated within the model as a "string."

The sensitive data, at least when it is in an unencrypted form, is configured to be compliant to the open standard schema. After incorporating the encrypted version of the sensitive data into the model, the process 60 may further include a step of allowing a privileged user to convert between the encrypted version and the unencrypted form. The encrypted version of the sensitive data may be stored in at least one of a memory device, RAM, a database, a log, a message field, and a syslog field within the distributed microservice framework. The distributed microservice framework may be part of a Software-Defined Network (SDN) architecture. The process 60 may also include a step of automatically creating the encrypted version of the sensitive data in response to receiving a deserialized model.

The process 60 may also include steps of a) receiving one or more sets of encrypted versions of sensitive data from an upstream microservice component, and b) transmitting the one or more sets of encrypted versions of sensitive data to a downstream microservice component. Alternatively, the process 60 may include steps of a) receiving one or more sets of encrypted versions of sensitive data from an upstream microservice component, and b) decrypting the one or more sets of encrypted versions of sensitive data according to a code plug-in and without relying on a software application to handle serialization and deserialization of the sensitive data.

The step of incorporating the encrypted version of the sensitive data within the model (block 64) may further include a step of enabling a privileged user to enter an extension within the model, wherein the extension includes a user command to encrypt an unencrypted version of the sensitive data and a field name to be used for identifying a field of the model to be encrypted. The field may be an entire container of the model and/or a leaf of the container. The process 60 may also include steps of a) automatically creating the field within the model based on the user command, and b) supplying the field name to the field. Also, the process 60 may include a step of automatically removing the unencrypted version of the sensitive data.

Before the step of automatically creating the encrypted version (block 62), the process 60 may include steps of a) identifying one or more fields in the model that include the sensitive data, and b) tagging the one or more fields as being encryptable. The process 60 may also include a step of allowing a privileged user to apply additional encrypting or hashing to data transmitted within the distributed microservice framework. The encrypted version of the sensitive data may be configured to hide the sensitive data from one or more non-privileged users using one or more northbound interfaces in the distributed microservice framework and reduces a potential attack space within the distributed microservice framework where the one or more non-privileged users might access the sensitive data. In some embodiments, the distributed microservice framework may include a photonic line operating according to trade secrets defining operational settings and computations related to the photonic line, wherein the sensitive data includes the trade secrets.

Therefore, the systems and methods described herein may allow a way to generically hide data that is recoverable, without forcing the application to handle the serialization/deserialization (i.e., SerDes) of the data. Also, the embodiments of the present disclosure allow data to be hidden generically from logs and interfaces associated with users who do not have the authority to view them. The present embodiments also allow data to be hidden "in RAM" (e.g., in the memory device 14, database 20, or other storage device). Also, the present disclosure allows sensitive data to be handled by the framework automatically, regardless of any application-based encryption.

Furthermore, it may be noted that microservices may be modeled according to schemas or other network restrictions. One example of a modeling language for defining a schema is YANG, although other languages (e.g., Network Configuration Protocol (NETCONF)) may be used. Basically, a schema may define what fields are included in the various objects and what types they are defined by (e.g., integer, Boolean, enumeration, string, etc.). If it is determined that it would be beneficial for a vendor or network equipment provider to encrypt certain information (e.g., config data) and/or to hide certain sensitive values, definitions, etc. Conventional system may normally encrypt an entire pipe on every transport layer.

The embodiments may include a way to identify what fields in the model are configured as having the capability of being encrypted. The systems and methods herein are able to automatically add encrypted versions of those leaves in the model. The encrypted versions are designated as having the type "string." For example, if the field originally has type "integer" in the model, a modified model, as shown in FIGS. 4B and 5B, can be created having new fields that correspond to all the encrypted forms of those fields.

One reason why this is done this way is that, when data is being serialized and being sent from a server to a client, or vice versa, everything that is sent back and forth has to be schema-compliant. Thus, if it would be desirable to send this data as encrypted versions of an integer, the type cannot simply be designated as "string" because the schema may define the field as an integer. Hence, the systems and methods of the present disclosure are configured to make copies of these fields in the model that refer to encrypted version, and these new leaves or containers may be designated as strings.

Referring again to FIGS. 4 and 5, the leaf test designates the data type as uint32. By including the name of a new encrypted field (e.g., test-secret), part of the process may include automatically creating a leaf (FIG. 4B) or a container (FIG. 5B) in the model that has type string. The "decrypt: leaf 'test'" line point to the leaf test field and indicates that it is an encrypted version of the test leaf. The leaf test points back to the leaf test-secret and indicates that it is the unencrypted form of this test secret. The automatically created data in the model may be configured as metadata and can point back and forth. These two fields (i.e., leaf test and leaf test-secret) form a pair and are related to each other with the metadata linking them together. When serializing data to JSON, XML, etc., the system can identify these pairs.

When data is sent, the leaf test may be removed in some embodiments in order to avoid observation by non-privileged users. With conventional encryption, a password may be sent to one microservice component 32, which will then send it through a number of other microservice components until it eventually reaches a security microservice. The security microservice, for example, may be configured to authenticate the password, make sure the password follows certain rules, etc. However, it should be understood that this conventional strategy may inadvertently expose the password as it is being transmitted from the first microservice component to the security component. Of course, it can be detrimental for the security of trade secrets or other types of secret data. Not only does a user (e.g., network operator) wish to keep all sensitive data (e.g., passwords) secure within a network system, but also a vendor or equipment provider may also with to keep all sensitive config data, trade secrets, and other secret data safe from prying eyes. With passwords, entered data may be turned into a hash which can then be compared at the security module, thereby preventing the passwords themselves from being public. Intermediate microservice components may then only see the hash and never the passwords themselves. In a similar manner, secret data may be handled in the manner described in the present disclosure to hide or obfuscate secret data transmitted throughout a distributed microservice framework.

Thus, the embodiments of the present disclosure are configured to impose this new model on every microservice component that the secret data may go through. That is, the automatic model modifications may be part of the framework itself and may not reside in the application. The present embodiments provide this ability to the framework such that, as soon as an unencrypted form of some data is detected, it will convert to an encrypted form. Then, every microservice component downstream will only see the encrypted form. Of course, at least one downstream component will be able to decrypt the encrypted version to retrieve the original content. For example, a security microservice component may wish to perform a validity check on a password to determine if the password meets certain criteria (e.g., includes at least one capital letter, includes a special character, etc.). Then, if necessary, the security component can pass along the encrypted version to further downstream components.

In one example, the distributed microservice framework 30 may include a northbound interface (NBI) or other type of external interface, which might connect on NETCONF. Suppose a client might say set a test field, for example, to 3, because maybe he or she does not know how to encrypt it or he or she does not want to be bothered with encryption and just sends the data in an unencrypted form. However, as soon as this data is deserialized, the systems and methods of the present disclosure may be configured to throw away the test (e.g., leaf test, container test, etc.) and replace it with the test secret (e.g., leaf test-secret, container test-secret, etc.). It may be noted that since each microservice component 32 may be configured with the automatic encryption techniques described in the present disclosure, the model modification to replace unencrypted data with encrypted data can occur at the very beginning, when the data is first detected as being unencrypted but is encryptable. Then, every component downstream will see just the test secret version of the container and/or leaf.

The metadata (e.g., encrypt:leaf "test-secret") may be left in the model so that the test knows that the encrypted form is included (i.e., in "leaf test-secret"). The test secret knows that if the data gets decrypted, then the microservice may refer back to the "leaf test" version. The system automatically converts this to a string for consistent handling of the encrypted versions.

By encrypting from the start, it is possible to minimize the amount of time that secret data is unencrypted, which thereby minimizes attack vectors where nefarious actors might attempt to crash the system or programs. For example, in a core file that gets generated when there is a crash, it may be possible for a third party user to see clear text passwords and other sensitive data. Thus, by intentionally crashing a system, it may be possible to see the secret or sensitive data in an intermediate microservice component. The hacker may then be able to search through the core file to find these clear text files. Thus, the present disclosure is also configured to keep secret data in memory (e.g., RAM, database, logs, etc.) as little as possible.

With the functionality of the local encryption program 24 installed in each microservice component 30, it is possible to encrypt secret data at any time that it is first detected to meet more stringent security purposes. Thus, the internal or local encryption can allow the encryption in the framework itself, which may include any number of microservice components in the chain or pipe. This allows encrypted versions to pass through the pipe and provide a consistent way of doing this throughout the entire framework. Thus, by implementing local encryption in the framework, every component can perform the encryption techniques the same way, which can make it easier for groups of people (e.g., users, network operators, etc.) to do encryption the same way and be on the same wavelength in this regard.

One use case that is applicable to the present disclosure is for a microservice in photonics. A vendor may create a photonics line (e.g., optical demultiplexers, optical multiplexers, optical amplifiers, monitors, power control devices, etc.). The photonics line may include several secret or sensitive data associated with each of the various elements thereof. For example, some secret data may include various power settings, how power is monitored, characteristics of bandwidth utilization, etc.). These may include specific details about intense calculations for characterizing the photonics line. Of course, such a vendor would not want the specific details of the finely tuned equipment to be public, since this data may be trade secrets. Thus, converting the clear text into an encrypted version, as described in the present disclosure, can be used to reduce the possibility that the secret information may fall into the hands of a competitor or a nefarious hacker.

Customers may care about the security for their own network and not think about the possibility that trade secrets important to a vendor should also be protected (hidden, transparent, encrypted, etc.). A customer may use certificate management, Hypertext Transfer Protocol Secure (HTTPS), etc. to secure their network, transport layers, and other interests, such as to make sure that their passwords are not hacked. They may not be concerned as much about the trade secret information associated with the vendor.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A microservice system configured to operate according to an open standard schema and having a distributed microservice framework, the microservice system comprising:
 a processing device, and
 a memory device configured to store a computer program having instructions that, when executed, enable the processing device to perform the steps of
  automatically creating an encrypted version of sensitive data, and
  incorporating the encrypted version of the sensitive data within a model associated with the microservice system.

2. The microservice system of claim 1, wherein the instructions further enable the processing device to perform the step of communicating the encrypted version of the sensitive data downstream within the distributed microservice framework.

3. The microservice system of claim 1, wherein the sensitive data includes configuration data associated with the microservice system.

4. The microservice system of claim 1, wherein the instructions further enable the processing device to perform the step of defining a type of the created encrypted version incorporated within the model as a string.

5. The microservice system of claim 1, wherein the sensitive data, at least when in an unencrypted form, is compliant to the open standard schema.

6. The microservice system of claim 1, wherein, after incorporating the encrypted version of the sensitive data into the model, the instructions further enable the processing device to perform the step of allowing a privileged user to convert between the encrypted version and the unencrypted form.

7. The microservice system of claim 1, wherein the encrypted version of the sensitive data is stored in at least one of a memory device, Random-Access Memory (RAM), a database, a log, a message field, and a syslog field within the distributed microservice framework.

8. The microservice system of claim 1, wherein the distributed microservice framework is part of a Software-Defined Network (SDN) architecture.

9. The microservice system of claim 1, wherein the instructions further enable the processing device to perform the step of automatically creating the encrypted version of the sensitive data in response to receiving a deserialized model.

10. The microservice system of claim 1, wherein the instructions further enable the processing device to perform the steps of
 receiving one or more sets of encrypted versions of sensitive data from an upstream microservice component, and
 transmitting the one or more sets of encrypted versions of sensitive data to a downstream microservice component.

11. The microservice system of claim 1, wherein the instructions further enable the processing device to perform the steps of
 receiving one or more sets of encrypted versions of sensitive data from an upstream microservice component, and
 decrypting the one or more sets of encrypted versions of sensitive data according to a code plug-in and without relying on a software application to handle serialization and deserialization of the sensitive data.

12. The microservice system of claim 1, wherein the step of incorporating the encrypted version of the sensitive data within the model further includes the step of enabling a privileged user to enter an extension within the model, wherein the extension includes a user command to encrypt an unencrypted version of the sensitive data and a field name to be used for identifying a field of the model to be encrypted.

13. The microservice system of claim 12, wherein the field is one of an entire container of the model and a leaf of the container.

14. The microservice system of claim 12, wherein the instructions further enable the processing device to perform the steps of
 automatically creating the field within the model based on the user command, and
 supplying the field name to the field.

15. The microservice system of claim 12, wherein the instructions further enable the processing device to perform the step of automatically removing the unencrypted version of the sensitive data.

16. The microservice system of claim 1, wherein, before the step of automatically creating the encrypted version, the instructions further enable the processing device to perform the steps of
 identifying one or more fields in the model that include the sensitive data, and
 tagging the one or more fields as being encryptable.

17. The microservice system of claim 1, wherein the instructions further enable the processing device to perform the step of allowing a privileged user to apply additional encrypting or hashing to data transmitted within the distributed microservice framework.

18. The microservice system of claim 1, wherein the encrypted version of the sensitive data hides the sensitive data from one or more non-privileged users using one or more northbound interfaces in the distributed microservice framework and reduces a potential attack space within the distributed microservice framework where the one or more non-privileged users might access the sensitive data.

19. The microservice system of claim 1, wherein the distributed microservice framework includes a photonic line operating according to hidden defining operational settings and computations related to the photonic line.

20. A method configured to be performed by a microservice system operating according to an open standard schema where the microservice system includes a distributed microservice framework, the method comprising the steps of:
   automatically creating an encrypted version of sensitive data, and
   incorporating the encrypted version of the sensitive data within a model associated with the microservice system.

* * * * *